Feb. 11, 1969  E. MASSAR  3,427,482
APPARATUS FOR GENERATING AN ELECTRIC CURRENT
IN A SUPERCONDUCTIVE COIL
Filed March 10, 1966

United States Patent Office 3,427,482
Patented Feb. 11, 1969

3,427,482
APPARATUS FOR GENERATING AN ELECTRIC CURRENT IN A SUPERCONDUCTIVE COIL
Ernst Massar, Erlangen, Germany, assignor to Siemens Aktiengesellschaft, Munich, Germany
Filed Mar. 10, 1966, Ser. No. 533,165
Claims priority, application Germany, Mar. 24, 1965, S 96,154
U.S. Cl. 310—10     18 Claims
Int. Cl. H02k 9/00, 1/00

My invention relates to apparatus for generating an electric current in a coil.

In particular, my invention relates to an apparatus for generating an electric current in a superconductive coil.

In order to excite superconductive coils, which are situated in a thermally insulated container provided with liquid helium, it is conventional to supply direct current from a source situated at the exterior of the container to the coils through suitable conductors. After the desired field has been bulit up, the conductors are short-circuited within the refrigerated container by superconductive switches. The conductors which extend into the refrigerated container from the exterior thereof form heat bridges which, because of the relatively large cross section of the guides for the conductors, require a considerable amount of refrigerating power.

It has therefore become customary in recent times to supply the superconductive coils with current from a generator built into the structure which refrigerates the coils. According to one known construction of this latter type, the field of a rotary permanent magnet passes through a superconductive disc of lead, the center of this disc being connected with one end of the superconductive coil. The other end of the coil is connected with an outer edge of the superconductive disc. The field intensity of the permanent magnet, driven by a shaft which extends into the thermally insulated container, is so great that the lead plate assumes the normally conductive state at that region where the magnetic flux passes through the plate. When the flux zone which rotates with the permanent magnet passes through the superconductive circuit formed by the superconductive coil, the conductors extending from the coil to the lead plate, and the plate itself, then a current is generated in this circuit, and this current increases the flux of the permanent magnet by a corresponding opposed flux at other locations of the superconductive circuit. At every revolution of the permanent magnet the current increases in a jerky manner. In this way the superconductive coil becomes excited with increasing intensity. In order to increase the potential and the speed of revolution which is limited because of the armature reaction, it has already been proposed to arrange several superconductive segments along the periphery of a disc and to connect these segments to each other in such a way that the potentials thereof are added to each other.

In order to achieve greater power and potential, it has also been already proposed to replace the permanent magnet with a rotary field achieved by way of stationary windings supplied with alternating current. These windings are situated outside of the low-temperature container and are not superconductive. Because of the relatively large non-magnetic region which must be bridged by the flux, there is a considerable expense involved in providing the exciting power. Moreover, the structure which provides the rotary field is expensive.

It is, therefore, a primary object of my invention to provide a generator capable of generating an electric current in a superconductive coil with a structure which will avoid the above drawbacks.

In particular, it is an object of my invention to transfer a magnetic field of desired intensity from the exterior of the low-temperature container to a magnetic rotor of superconductive material situated therein and to maintain the magnetic field at this latter location.

It is also an object of my invention to provide a structure capable of achieving greater field intensity at the magnetic rotor than is possible with the known magnetic rotor having a permanent magnet.

Also, it is an object of my invention to provide a structure which will avoid any unbalance.

Also, it is an object of my invention to provide, in contrast to those constructions where a rotary field acts from the exterior of the low-temperature container, an initial excitation of the generator, prior to starting of the operation, which requires only a relatively small expenditure of energy.

Primarily the structure of my invention includes a superconductive coil means and a superconductive magnetic rotor means both of which are situated in a refrigerated container means which provides for the coil means and rotor means a temperature lower than the critical temperature so as to render the coil means and rotor means superconducting. In accordance with my invention, the magnetic rotor means is situated in a gap defined by an electromagnetic means which is situated at the exterior of the container means which houses the coil means and rotor means.

My invention is illustrated by way of example in the accompanying drawings which form part of my application and in which.

Figure 1:
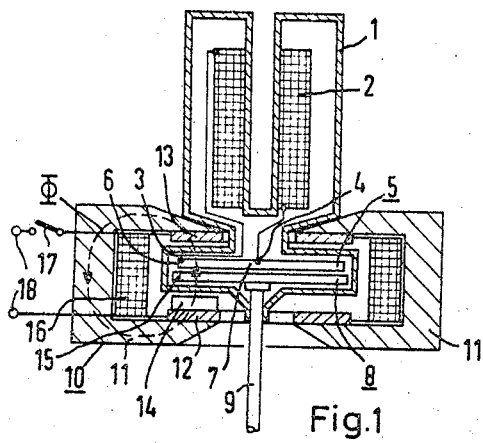
FIG. 1 is a schematic longitudinal sectional elevation showing one possible structure according to my invention where there is arranged within a low-temperature container a generator connected with a superconductive coil.

Referring now to FIG. 1, there is schematically illustrated therein a low-temperature, thermally insulated container means 1 adapted to contain liquid helium, for example. The refrigerated container means 1 houses a superconductive coil means which includes the superconductive coil 2 having ends 3 and 4 respectively connected with the outer periphery 6 and the center portion 7 of a superconductive disc 5 of the coil means, so that in this way the disc 5 is electrically connected with the coil 2. Acting perpendicularly on the disc 5 is a magnetic field Φ of a magnetic rotor means driven by a drive means which includes a shaft 9 extending from the exterior into the interior of the container means 1. In accordance with my invention, the generator includes the magnetic rotor 8 in the form of a circular disc or cylinder made of superconductive material and situated in a gap defined by an electromagnetic means 10 which is situated at the exterior of the refrigerated container means 1. It is preferred to make the circular rotor means 8 of a hard superconductive material.

The electromagnetic means 10 is composed preferably of a pair of opposed substantially U-shaped yokes 11 each terminating in a pair of poleshoes and arranged with the poleshoes of one yoke directed toward the poleshoes of the other yoke, respectively. The poleshoes of one yoke engage a pair of parallel coaxial magnetic rings 12 and 13, and poleshoes of the other yoke also engage the pair of magnetic rings 12 and 13. The ring 12 is provided with a number of poles 14 corresponding to the number of pole pairs of the magnetic rotor means 8 which is connected to the drive shaft 9 to be rotated thereby. The rings 12 and 13 serve to provide flux distribution during the initial magnetization, and during operation they serve to provide magnetic short-circuiting. The exciting coil 16 of the electromagnetic means is in the form of an annular winding.

In order to magnetize the rotor 8, prior to lowering the temperature of the interior of the container means 1, the exciting coil 16 is connected by way of its terminals 18 and through a switch 17 with a source of direct current. In this way, there is formed a magnetic flux $\Phi$ which primarily passes from the pole 14 to the ring 13 and forms a closed path through the yokes 11. In order to prevent wandering of the field during rotation of the disc-shaped rotor 8 and in order to determine the cross section of the flux zone, the rotor means 8 is provided with a number of openings 15 which correspond to the number of pole pairs of the rotor means 8.

Before magnetizing is started, the rotor means 8 is turned so that the openings 15 are aligned with the poles 14. Then the rotor means 8 is rendered superconducting, for example by filling the container means 1 with liquid helium. Then the excitation of the coil 16 is terminated, since the magnetic field of the rotor means 8 becomes self-sustaining after the superconducting state is reached. During rotation of the magnetic rotor 8, the magnetic field which turns with the rotor means 8 moves with respect to the disc 5 of the coil means and generates a current therein.

Figure 2:
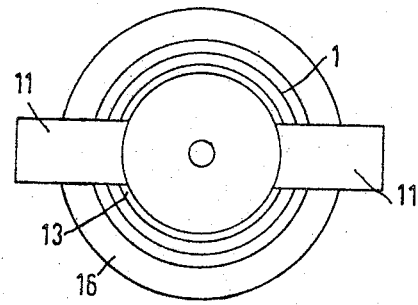
FIG. 2 is a top plan view of the structure of FIG. 1.
Figure 3:
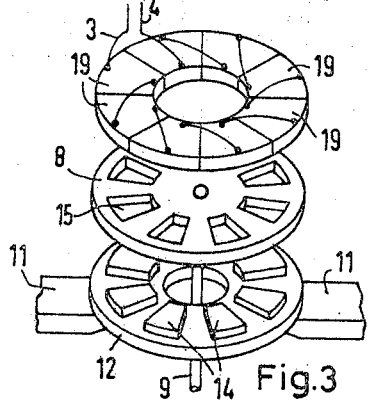
FIG. 3 is a schematic illustartion of the exciting arrangement for a multiple-pole generator, the individual components being shown in an exploded perspective illustration in FIG. 3.

With the generator which is illustrated in FIGS. 1 and 2, it is possible to supply only coils of relatively low inductance. In order to achieve higher potentials, which are required to supply larger coils, it is possible in a known way to construct the disc 5 from a plurality of segments 19 which are electrically connected in series (FIG. 3). Also, the ring 12, or the ring 13, is provided with a number of poles 14, while the rotor means 8 is formed with an equal number of openings 15, the number of poles 14 also corresponding to the number of pole pairs of the rotor means 8.

Figure 4:
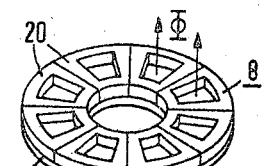
FIG. 4 is a perspective view of a magnetic rotor of my invention.

It is also of advantage to form the magnetic rotor means 8 from individual superconductive segments 20 which are electrically insulated from each other (FIG. 4). In this way the formation of a ring current composed of several poles in the superconductive material is prevented, and moreover disturbing lack of pole uniformity is avoided. The several segments 20 can be mounted on a carrier plate 21 of normal conductivity. It is also possible to use for the carrier plate 21 an electrically non-conductive material such as, for example, a plastic.

It is also possible to eliminate the use of a carrier plate by combining the individual segments 20 together into a ring by interposing between the segments 20 layers of material of poor electrical conductivity.

Figure 5:
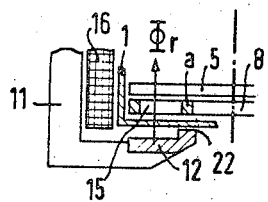
FIG. 5 is a fragmentary sectional elevation of an exciting structure of my invention together with a magnetic rotor.

During rotary movement of the rotor means 8, it is possible for disturbing influences and additional losses to occur because of the changing magnetic resistance of the magnetic path. In order to avoid this latter type of operation, it is preferred to provide at least one of the rings 12 or 13, at its face which is directed toward the rotor 8, which is provided with the openings 15, with an annular projection 22, and in accordance with the method of my invention to excite the winding 16 of the electromagnetic means 10 to such an extent that the critical field intensity is exceeded in the part $a$ of the rotor means 8 which is situated opposite the annular projection 22 (FIG. 5). The winding 16 is excited in order to provide the magnetic flux, in this case, only when the disc 5 of the coil means and the magnetic rotor means 8 are brought into the superconducting state. As the current in the winding 16 increases, the field intensity increases, until it achieves in the portion $a$ of the rotor 8, which is situated opposite the projection 22, a value in excess of the critical value so that normal conductivity is provided at this location. The flux can then pass through the openings 15 of the rotor means 8, where the flux then continues to increase until the ring current induced by this increase in flux decays. Upon a slight reduction in the excitation by reduction of the current in the winding 16, the portion $a$ of the rotor means 8 becomes again superconducting, so that the flux $\Phi$ which is present at this time in the openings 15 is maintained. Thus, this construction, as compared to that of FIGS. 1 and 2, provides the advantage that the temperature of the cooling medium need not be changed when the magnetic field is transferred to the rotor.

Figure 6:
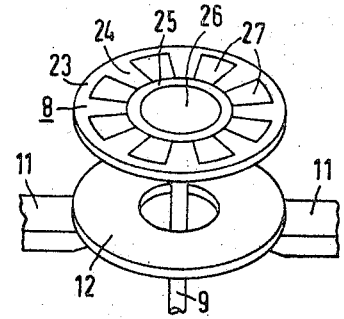
FIG. 6 is an exploded perspective view of another embodiment of an exciting structure together with a magnetic rotor.

As is shown in FIG. 6, the rotor means 8, or the individual segments thereof, may be composed of two different superconductive materials, one of which is situated radially beyond the other. Preferably the magnetic rotor means 8 is composed of a superconductive toothed ring 23 having inwardly extending teeth 24 on which a ring 25 of superconductive material is mounted, this material of the ring 25 having a critical field intensity of smaller magnitude than that of the toothed ring 23. In this way it is possible to eliminate at the ring 12 an annular projection or special poles so that the magnetic system has a simpler construction. The transfer of the magnetic field to the rotor means 8 can take place in a manner similar to that shown in FIG. 5 and described above. Instead of using a ring 25 having a lesser critical field intensity than the toothed ring, it is also possible to use a ring having a lower critical temperature.

The active part of the rotor means 8 can be connected with the drive shaft 9 by material 26 of normally conductive properties. Moreover, the openings 15 of the rotor means 8 can be filled with material of normal conductivity or with material which is not electrically conductive, such as a plastic material. FIG. 6 shows the elements 27 which fill the openings 15. In this way it is possible to reduce to a considerable extent friction losses occuring during rotation of the rotor means in the liquid helium.

In order to maintain the cost for the liquid cooling medium low, it is of advantage to manufacture the drive shaft 9 either entirely or in part of a plastic material.

I claim:

1. In a generator for generating an electric current, superconductive coil means in which a current is to be generated, rotary superconductive magnetic rotor means situated adjacent said coil means, refrigerated container means housing said coil means and rotor means for maintaining them at less than the critical temperature for rendering said coil means and rotor means superconducting, drive means extending from the exterior of said container means to the interior thereof and operatively connected to said rotor means for rotating the latter, and elecromagnetic means situated at the exterior of said container means and defining a gap in which said rotor means is situated.

2. The combination of claim 1 and wherein said rotor means is made of a hard superconductive material.

3. The combination of claim 1 and wherein said electromagnetic means includes a pair of opposed substantially U-shaped yokes each terminating in a pair of poleshoes, and the poleshoes of one yoke being directed toward the poleshoes of the other yoke, respectively, and said electromagnetic means including a pair of magnetic rings situated in substantially parallel planes with the poleshoes of one yoke engaging said rings, respectively, and the poleshoes of the other yoke also respectively engaging said rings, said rings together with said yokes defining said gap in which said rotor means is situated.

4. The combination of claim 3 and wherein said rotor means has a given number of pole pairs, and at least one of said rings carrying a corresponding number of poles.

5. The combination of claim 1 and wherein said rotor means has a given number of pole pairs, and said rotor means being formed with a number of openings corresponding to the number of pole pairs.

6. The combination of claim 1 and wherein said rotor means is of a circular configuration and is composed of a plurality of superconductive segments which are insulated from each other.

7. The combination of claim 6 and wherein said rotor means includes a carrier plate of normal conductivity carrying said segments.

8. The combination of claim 6 and wherein said rotor means includes an electrically non-conductive carrier plate carrying said segments.

9. The combination of claim 1 and wherein said rotor means is of a circular configuration and has a given number of pole pairs, said rotor means being formed with a number of openings corresponding to the number of pole pairs, and said electromagnetic means including a pair of magnetic rings between which said rotor means is situated, one of said rings having an annular projection extending toward said rotor means.

10. The combination of claim 1 and wherein said rotor means is of circular configuration and is composed of two different superconductive materials one of which is situated radially beyond the other.

11. The combination of claim 10 and wherein said rotor means includes a superconductive toothed ring made of one of said materials and a second superconductive ring engaging the teeth of said toothed ring and made of the other of the superconductive materials, said second ring having a critical field intensity of smaller magnitude than said toothed ring.

12. The combination of claim 10 and wherein said different materials respectively have different critical temperatures.

13. The combination of claim 1 and wherein said rotor means is of a circular configuration and has a given number of pole pairs, said rotor means being formed with a number of openings corresponding to the number of pole pairs and said openings being filled with non-superconductive material.

14. The combination of claim 13 and wherein said non-superconductive material has normal conductivity.

15. The combination of claim 13 and wherein said non-superconductive material is not electrically conductive.

16. The combination of claim 1 and wherein said drive means includes a drive shaft made of a plastic material and operatively connected with said rotor means.

17. The combination of claim 1 and wherein said rotor means is of a circular configuration.

18. In a method of generating an electric current in a superconductive coil means situated together with a superconductive rotor means in a refrigerated container means which maintains said coil means and rotor means at a temperature below the critical temperature for rendering said coil means and rotor means superconducting, and wherein said rotor means is situated in a gap defined by an electromagnetic means situated at the exterior of the refrigerated container means and including a pair of magnetic rings between which said rotor means is located with one of said rings having an annular projection extending towards said rotor means and said rotor means being formed with a number of openings corresponding to the number of pole pairs of said rotor means, the step of exciting said electromagnetic means to an extent which will provide in the portion of said rotor means which is situated opposite said projection a field intensity which exceeds the critical field intensity.

References Cited

UNITED STATES PATENTS 3,336,489  8/1967  Volger _____ 310—40

OTHER REFERENCES

Periodical, Electrical Review, Jan. 3, 1964, p. 22.

J. D. MILLER, *Primary Examiner.*

DAVID X. SLINEY, *Assistant Examiner.*